US009823847B2

(12) United States Patent
Miller et al.

(10) Patent No.: US 9,823,847 B2
(45) Date of Patent: Nov. 21, 2017

(54) OPTIMIZED COPY ALGORITHM SELECTION (71) Applicant: International Business Machines Corporation, Armonk, NY (US)

(72) Inventors: Dash D. Miller, Tucson, AZ (US); Miguel A. Perez, Tucson, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 14/629,519

(22) Filed: Feb. 24, 2015

(65) Prior Publication Data
US 2016/0246511 A1    Aug. 25, 2016

(51) Int. Cl.
| G06F 12/00 | (2006.01) |
| G06F 3/06 | (2006.01) |
| G06F 11/20 | (2006.01) |
| H04L 29/08 | (2006.01) |
| G06F 17/30 | (2006.01) |
| H04L 12/911 | (2013.01) |

(52) U.S. Cl.
CPC ............ *G06F 3/0607* (2013.01); *G06F 3/065* (2013.01); *G06F 3/067* (2013.01); *G06F 11/2056* (2013.01); *G06F 11/2058* (2013.01); *G06F 17/30581* (2013.01); *G06F 2201/855* (2013.01); *H04L 47/728* (2013.01); *H04L 67/1095* (2013.01)

(58) Field of Classification Search
CPC ............... H04L 67/1095; H04L 47/728; G06F 11/2056; G06F 11/2058; G06F 2201/855; G06F 17/30581
USPC ........................................................ 711/165
See application file for complete search history.

(56) References Cited

U.S. PATENT DOCUMENTS

| 6,078,932 A | 6/2000 | Haye et al. |
| 8,650,145 B2 | 2/2014 | Navarro et al. |
| 2005/0108565 A1 | 5/2005 | Blea et al. |
| 2013/0263088 A1* | 10/2013 | Hoff .......................... G06F 8/61 717/121 |

* cited by examiner

*Primary Examiner* — Mardochee Chery
(74) *Attorney, Agent, or Firm* — Nelson and Nelson; Daniel P. Nelson; Alexis V. Nelson (57) ABSTRACT A method for increasing the efficiency of copying data is disclosed. In one embodiment, such a method includes receiving a request to copy data from a first location to a second location. The method determines an original copy algorithm associated with the request and determines whether the original copy algorithm is the best copy algorithm available to copy the data. If the original copy algorithm is the best copy algorithm, the method uses the original copy algorithm to copy the data. If, however, the original copy algorithm is not the best copy algorithm available, the method substitutes a more efficient copy algorithm for the original copy algorithm. In certain embodiments, this may be accomplished by looking in a prioritized list of copy algorithms and selecting a more efficient copy algorithm from the list. A corresponding system and computer program product are also disclosed.

20 Claims, 5 Drawing Sheets

OPTIMIZED COPY ALGORITHM SELECTION

BACKGROUND

Field of the Invention

This invention relates to systems and methods for copying data, and more specifically to systems and methods for selecting an optimal copy algorithm to copy data.

Background of the Invention

Over time and with improvements in hardware and other technology, data copy algorithms are improved to be faster and more efficient. IBM's System Data Mover (SDM) currently can implement both the "Concurrent Copy" and "FlashCopy" point-in-time copy algorithms, each of which was developed at different times. Concurrent Copy is the oldest and slowest method of copying data but is versatile since the source and target volumes can be on different LSS hardware configurations. Concurrent Copy also requires a certain amount of auxiliary storage to operate properly. This auxiliary storage is used to store a "sidefile" that maintains a copy of changed tracks that have yet to be copied. FlashCopy, by contrast, is the most recent and fastest method of copying data. FlashCopy provides a point-in-time copy of a volume with almost instant availability for the user of both the source and target volumes. However, for Flash-Copy to be used, the source and target volumes must both reside in the same LSS hardware configuration.

In certain cases, users may experience sub-optimal efficiency because they are using older copy algorithms that were the only options available at the time batch jobs were created for copying data. For example, large numbers of batch jobs were created using the oldest Concurrent Copy algorithm. Today these jobs are still frequently used even though the FlashCopy algorithm is available. This is at least partly because converting the jobs to use newer and more efficient copy algorithms requires significant labor costs associated with hardware reviews and hours of Job Control Language (JCL) conversions.

In view of the foregoing, what are needed are systems and methods to enable use of the most efficient copy algorithms available for particular hardware configurations. Ideally, such systems and methods will enable the copy algorithms to be used without requiring changes or updates to batch jobs or other executable code using older and less efficient copy algorithms.

SUMMARY

The invention has been developed in response to the present state of the art and, in particular, in response to the problems and needs in the art that have not yet been fully solved by currently available systems and methods. Accordingly, systems and methods are disclosed for increasing the efficiency of copying data. The features and advantages of the invention will become more fully apparent from the following description and appended claims, or may be learned by practice of the invention as set forth hereinafter.

Consistent with the foregoing, a method for increasing the efficiency of copying data is disclosed. In one embodiment, such a method includes receiving a request to copy data from a first location to a second location. The method determines an original copy algorithm associated with the request and determines whether the original copy algorithm is the best copy algorithm available to copy the data. If the original copy algorithm is the best copy algorithm, the method uses the original copy algorithm to copy the data. If, however, the original copy algorithm is not the best copy algorithm available, the method substitutes a more efficient copy algorithm for the original copy algorithm. In certain embodiments, this may be accomplished by looking in a prioritized list of copy algorithms and selecting a more efficient copy algorithm from the list.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
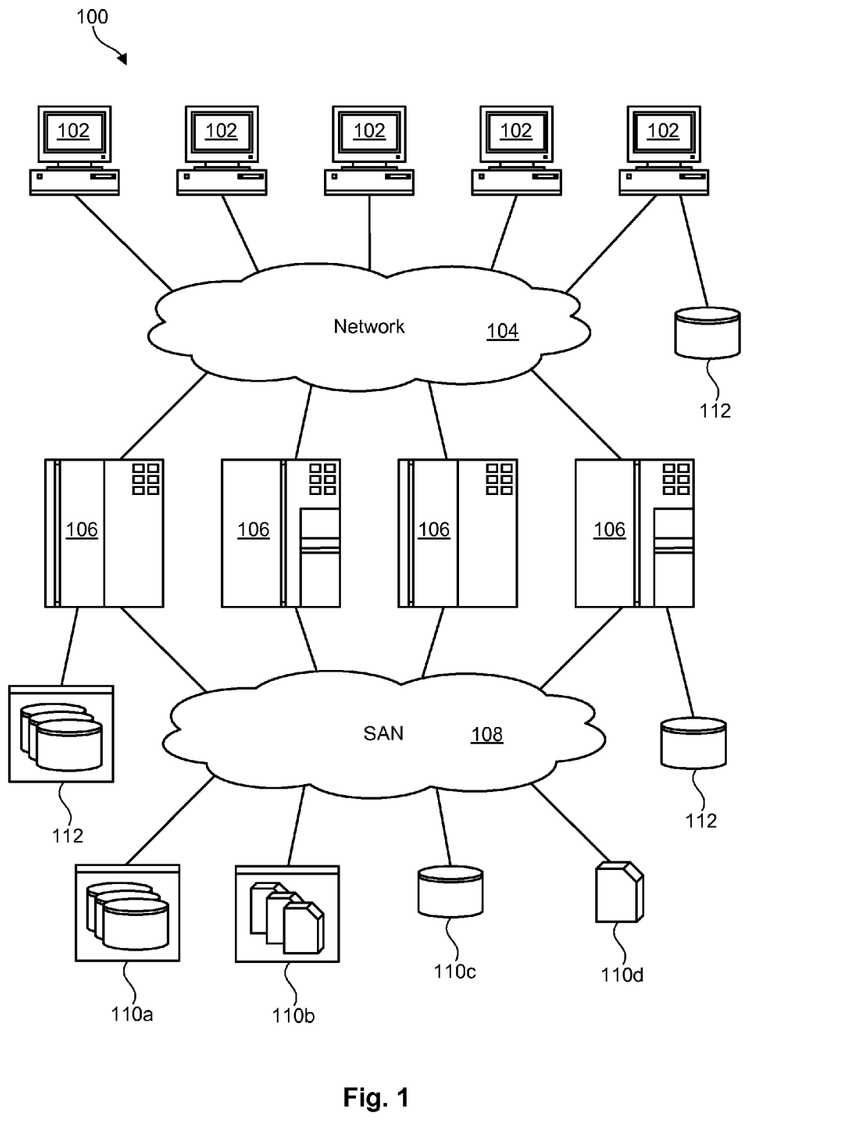
FIG. 1 is a high-level block diagram showing one example of an environment in which a system and method in accordance with the invention may be implemented.

Referring to FIG. 1, one example of a network architecture 100 is illustrated. The network architecture 100 is presented to show one example of an environment where the disclosed systems and methods may be implemented. The network architecture 100 is presented only by way of example and is not intended be limiting. Indeed, the systems and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may utilize the systems and methods disclosed herein.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may utilize the systems and methods disclosed herein.

Figure 2:
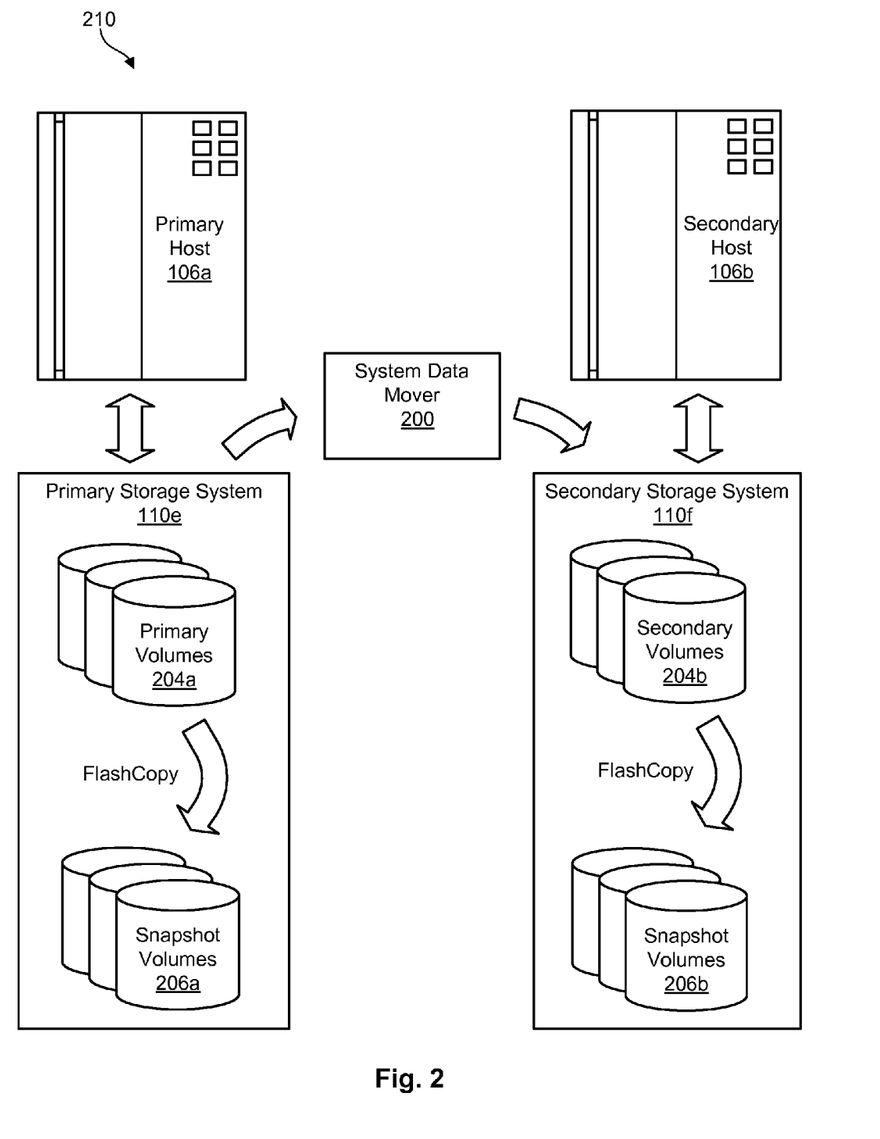
FIG. 2 is a high-level block diagram showing one embodiment of a system data mover for moving data within a data replication environment.

Referring to FIG. 2, a high-level block diagram showing a system data mover 200 for moving data on and between storage systems 110e, 110f is illustrated. In certain embodiments, each of the storage systems 110e, 110f contains arrays of hard-disk drives and/or solid-state drives, although other types of storage systems (tape libraries, CD-ROM libraries, etc) may also be used in different embodiments. Although the illustrated system data mover 200 may be embodied as IBM's System Data Mover or related products, it should be recognized that the system data mover 200 is not limited to IBM's System Data Mover (SDM), but may include any similar product or component that can receive and process data copy requests, regardless of the manufacturer. Thus, the systems and methods disclosed herein are not limited to IBM's System Data Mover but may encompass a wide variety of data copy services or components.

FIG. 2 shows one example of a data replication environment 210 where a system data mover 200 in accordance with the invention may operate. For example, in an Extended Remote Copy (XRC) environment, data written by a primary host system 106a to primary volumes 204a of a primary storage system 110e may be asynchronously copied to secondary volumes 204b of a secondary storage system 110f in order to provide data redundancy. The system data mover 200, which may be configured to run on the secondary host system 106b (although it may also run on other machines), may mirror writes made to the primary volumes 204a to the secondary volumes 204b. The system data mover 200 may ensure that dependent writes are executed in the proper sequence and that data residing on the secondary volumes 204b will provide a time consistent copy of data in the primary volumes 204a.

In addition to asynchronously mirroring data from primary volumes 204a to secondary volumes 204b, the system data mover 200 may also create and manage point-in-time copies of data. For example, IBM's System Data Mover may implement the FlashCopy algorithm to create point-in-time copies of particular volumes. As shown in FIG. 2, FlashCopy may take a snapshot of primary volumes 204a to create snapshot volumes 206a. Similarly, FlashCopy may take a snapshot of secondary volumes 204b to create snapshot volumes 206b. These snapshots 206a, 206b may be used for backup purposes or to create another partition for high availability, disaster recovery, or create a test environment for software developers.

Thus, the system data mover 200 may be configured to implement multiple data copy algorithms. The current version of IBM's System Data Mover can implement both the "Concurrent Copy" and "FlashCopy" point-in-time copy algorithms. As previously discussed, Concurrent Copy is the oldest and slowest method of copying data but is versatile because the source and target volumes can reside on different LSS hardware configurations. FlashCopy is the most recent and fastest method of copying data. FlashCopy provides a point-in-time copy of a volume, with almost instant availability for the user of both the source and target volumes. However, for FlashCopy to be used, the source and target volumes must reside in the same LSS hardware configuration.

Figure 3:
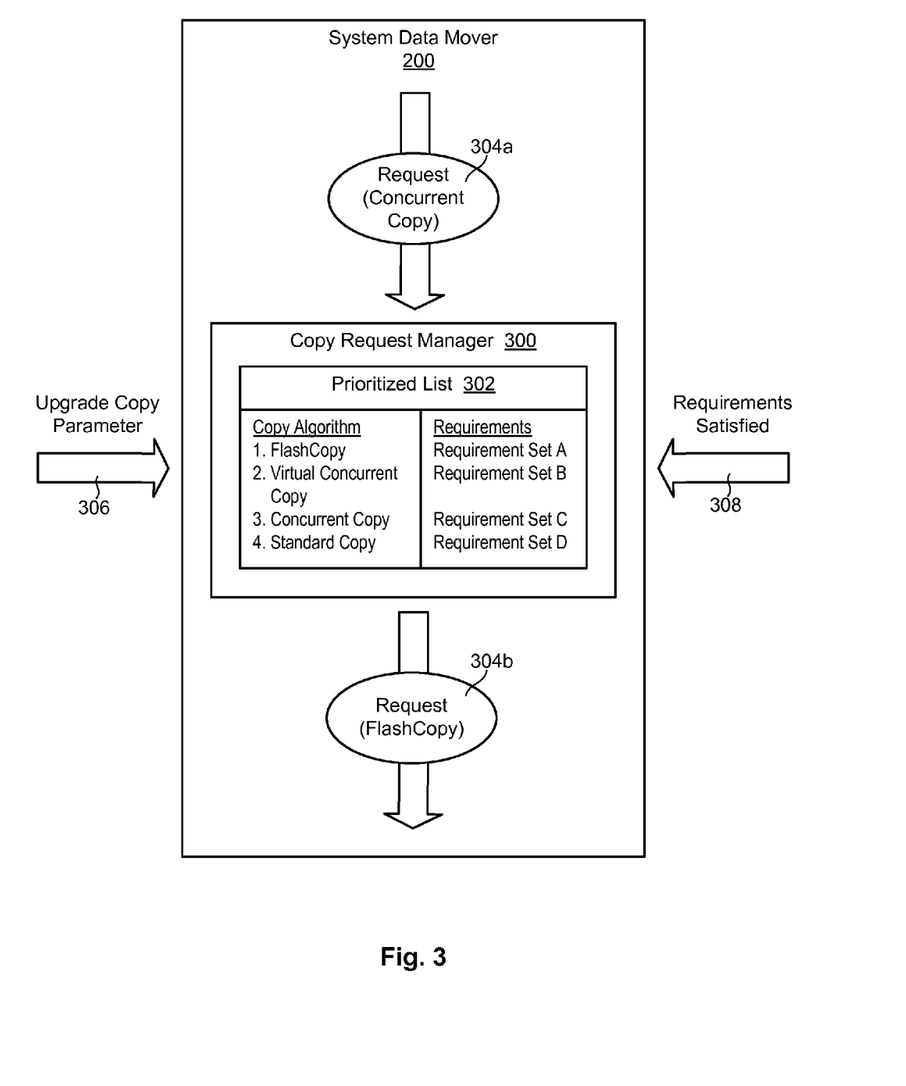
FIG. 3 is a high-level block diagram showing one technique for upgrading a copy request to include a more efficient data copy algorithm when hardware and/or other requirements are satisfied.

Referring to FIG. 3, as previously mentioned, users may experience efficiency problems because they are using older copy algorithms instead of newer more efficient copy algorithms. As was previously explained, prior to the release of FlashCopy, large numbers of batch jobs were created using the older Concurrent Copy algorithm. Today these jobs may still be in use even though the FlashCopy algorithm is available. Converting these jobs to use newer and more efficient copy algorithms requires significant labor costs associated with hardware reviews and hours of Job Control Language (JCL) conversions. Consequently, it would be an advance in the art for batch jobs or other executable code to be able to utilize more efficient copy algorithms without requiring changes or updates to the batch jobs or executable code.

In certain embodiments in accordance with the invention, a new parameter 306 (e.g., a yes/no option) may be established to authorize a system data mover 200 to use a most efficient copy algorithm available. When a user sets this parameter, a copy request manager 300 within or communicating with the system data mover 200 may be configured to intercept copy requests directed to the system data mover 200 and modify the requests to use a most efficient copy algorithm available. In order to accomplish this, the copy request manager 300 may be configured to reference a prioritized list 302 of copy algorithms. In certain embodiments, this prioritized list 302 may list copy algorithms from most efficient to least efficient. When the copy request manager 300 receives a copy request 304a, the copy request manager 300 may determine a copy algorithm associated with the request 304a and check the prioritized list 302 to determine if a more efficient copy algorithm is available. Determining whether a more efficient copy algorithm is available may include determining whether various requirements (e.g., hardware requirements, performance requirements, etc.) associated with the more efficient copy algorithm are satisfied. If a more efficient copy algorithm is available and requirements associated with the copy algorithm are satisfied, the copy request manager 300 may modify the request 304a (producing request 304b) to use the more efficient copy algorithm. Ideally, this will be the most efficient copy algorithm in the list 302.

As an example, assume that the copy request manager 300 receives a request 304a to copy data from a first location to a second location using the Concurrent Copy algorithm. If the upgrade copy parameter 306 is set, the copy request manager 300 will evaluate the request 304a to determine if a more efficient copy algorithm is available. Specifically, the copy request manager 300 will check the prioritized list 302 to determine if a more efficient copy algorithm is available. In the illustrated example, the prioritized list 302 contains four copy algorithms in order of their efficiency: FlashCopy; Virtual Concurrent Copy, Concurrent Copy, and Standard Copy. These represent examples of copy algorithms and are not intended to be limiting. As further shown, the prioritized list 302 also describes requirements, such as hardware requirements, performance requirements, performance objectives, or the like, for a particular copy algorithm. Such requirements may include or take into account, among other things, I/O statistics, auxiliary storage requirements, storage subsystem cache and/or non-volatile storage (NVS) requirements, networking utilization, RAMAC eligibility, or the like.

Figure 4:
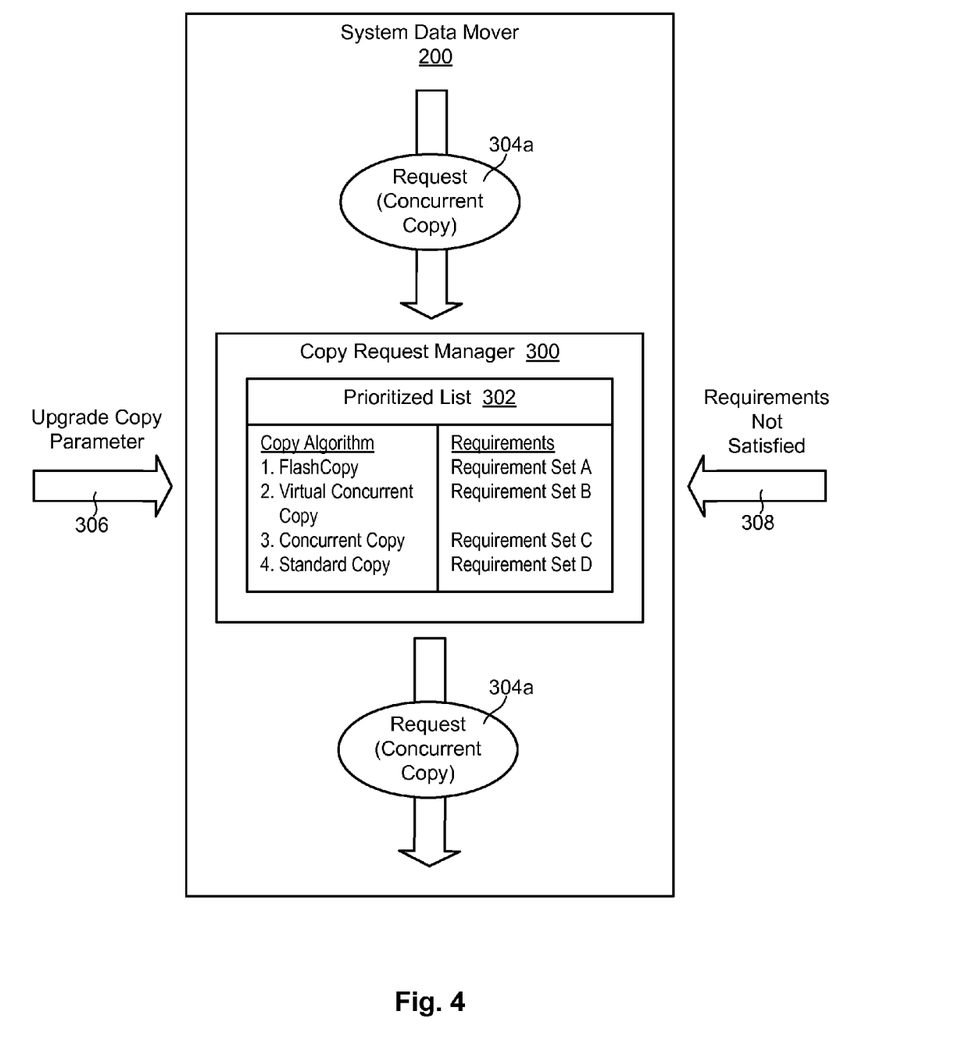
FIG. 4 is a high-level block diagram showing a scenario where a data copy request is left unchanged because hardware and/or other requirements are not satisfied.

Upon receiving the request 304a, the copy request manager 300 checks the prioritized list 302 to determine if a more efficient copy algorithm is available for a given hardware configuration. In certain embodiments, the copy request manager 300 starts from the top of the list 302. Thus, the copy request manager 300 will initially check the FlashCopy algorithm to determine if the copy algorithm can be used. This may include checking whether requirements associated with the FlashCopy algorithm are satisfied, such as whether source and target volumes for the data to be copied reside in the same LSS hardware configuration. If the requirements for the FlashCopy algorithm are satisfied, as indicated by system input 308, the copy request manager 300 modifies the request 304a to produce a request 304b that uses the more efficient copy algorithm, in this case Flash-Copy. If the requirements for FlashCopy are not satisfied, the copy request manager 300 would continue down the prioritized list 302 until a copy algorithm is encountered that has its requirements satisfied or until it reaches the original copy algorithm associated with the request 304a, in this case the Concurrent Copy algorithm. If requirements are not satisfied for a more efficient copy algorithm or if the original copy algorithm is the most efficient copy algorithm available, the copy request manager 300 simply leaves the original request 304a unchanged, as shown in FIG. 4.

Figure 5:
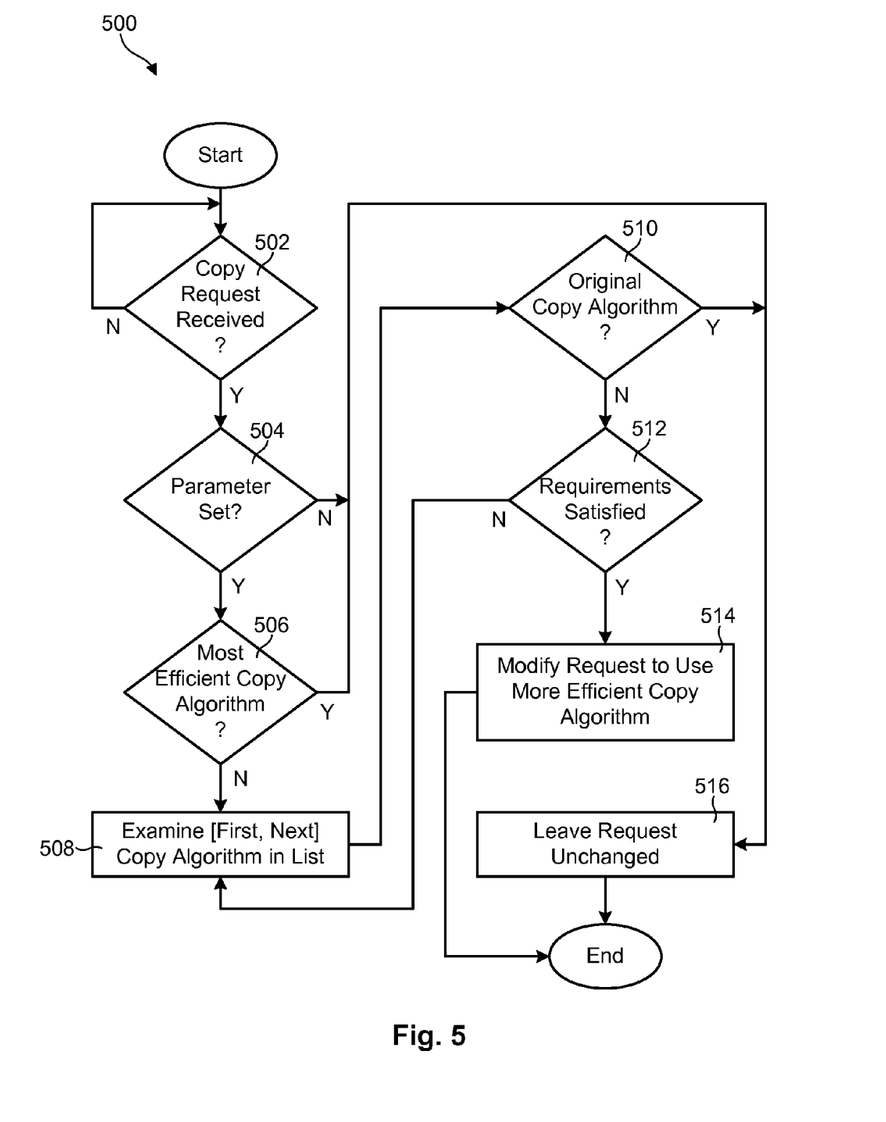
FIG. 5 is a flow diagram showing one embodiment of a method for upgrading a data copy request.

Referring to FIG. 5, a flow diagram showing one embodiment of a method 500 for upgrading a data copy request is illustrated. As shown, the method 500 initially determines 502 whether a copy request has been received. If a copy request has been received, the method 500 determines 504 whether a parameter (e.g., an "upgrade copy" parameter) has been set. As previously mentioned, this parameter may authorize a copy request manager 300 or other functionality to upgrade a copy request to a more efficient copy algorithm if one is available. If the parameter is not set, the method 500 may leave 516 the data copy request unchanged (i.e., use the original copy algorithm specified in the request). If, however, the parameter is set, the method 500 may determine 506 whether the original copy algorithm is the most efficient copy algorithm available. This may be accomplished, for example, by comparing the original copy algorithm with copy algorithms in a prioritized list 302 and determining whether a more efficient copy algorithm is listed, as previously discussed.

If the original copy algorithm is not the most efficient copy algorithm available, the method 500 examines 508 the first copy algorithm in the prioritized list 302. If the first copy algorithm in the list 302 is the original copy algorithm associated with the request, the method 500 leaves 516 the request unchanged and the method 500 ends. If the first copy algorithm is not the original copy algorithm, the method 500 determines 512 whether requirements (e.g., hardware requirements, performance requirements, etc.) associated with the first copy algorithm are satisfied. In certain embodiments, this may be accomplished by querying devices that are involved in the data copy operation to determine if the hardware satisfies the requirements. If the requirements are satisfied, meaning that the first copy algorithm can be used, the method 500 modifies 514 the request to use the first copy algorithm. The modified request may be passed to the system data mover 200 which may execute the request using the first copy algorithm.

If, however, the requirements for the first copy algorithm are not satisfied, the method 500 examines 508 the next copy algorithm in the prioritized list 302. If the next copy algorithm is the original copy algorithm associated with the request, the method 500 leaves 516 the request unchanged since the original copy algorithm is the most efficient copy algorithm available. If, however, the next copy algorithm is not the original copy algorithm, the method 500 determines 512 whether requirements associated with the next copy algorithm are satisfied. If the requirements are satisfied, meaning that the next copy algorithm can be used, the method 500 modifies 514 the request to use the next copy algorithm. The modified request may then be passed to the system data mover 200 which may execute the request using the next copy algorithm. If, however, the requirements for the next copy algorithm are not satisfied, the method 500 examines 508 the next copy algorithm in the prioritized list 302 in the manner previously discussed. This process continues until either a more efficient copy algorithm is found or the method 500 determines that the original copy algorithm is the most efficient copy algorithm that can be used.

The disclosed systems and methods are advantageous in that they allow for newer and more efficient copy algorithms to be implemented simply by updating the prioritized list 302 and/or updating functionality in the system data mover 200 or copy request manager 300, as opposed to requiring modification of jobs and other executable code that may be using slower and less efficient copy algorithms. Systems and methods in accordance with the invention eliminate a substantial amount of manual labor cost and improve overall system copy efficiency.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for increasing the efficiency of copying data, the method comprising:
   intercepting an original request to copy data from a first location to a second location using an original copy algorithm;
   determining whether a parameter is set to use a more efficient copy algorithm available to execute the original request;
   in the event the parameter is set, determining whether a more efficient copy algorithm is available to copy the data;
   if a more efficient copy algorithm is not available, leaving the original request unchanged; and
   if a more efficient copy algorithm is available, modifying the original request by substituting the more efficient copy algorithm for the original copy algorithm.

2. The method of claim 1, wherein substituting the more efficient copy algorithm comprises looking in a prioritized list of copy algorithms, and selecting the more efficient copy algorithm from the list.

3. The method of claim 2, wherein selecting the more efficient copy algorithm comprises selecting a most efficient copy algorithm in the list.

4. The method of claim 2, further comprising updating the list to include newer more efficient copy algorithms.

5. The method of claim 2, further comprising including, in the list, hardware requirements for each copy algorithm.

6. The method of claim 1, wherein determining whether a more efficient copy algorithm is available comprises determining whether the original copy algorithm is a best copy algorithm available based on a current hardware configuration.

7. The method of claim 1, wherein intercepting an original request comprises intercepting an original request intended for a system data mover.

8. A computer program product for increasing the efficiency of copying data, the computer program product comprising a computer-readable storage medium having computer-usable program code embodied therein, the computer-usable program code configured to perform the following when executed by at least one processor:
   intercept an original request to copy data from a first location to a second location using an original copy algorithm;
   determine whether a parameter is set to use a more efficient copy algorithm available to execute the original request;
   in the event the parameter is set, determine whether a more efficient copy algorithm is available to copy the data;
   if a more efficient copy algorithm is not available, leave the original request unchanged; and
   if a more efficient copy algorithm is available, modify the original request by substituting the more efficient copy algorithm for the original copy algorithm.

9. The computer program product of claim 8, wherein substituting the more efficient copy algorithm comprises looking in a prioritized list of copy algorithms, and selecting the more efficient copy algorithm from the list.

10. The computer program product of claim 9, wherein selecting the more efficient copy algorithm comprises selecting a most efficient copy algorithm in the list.

11. The computer program product of claim 9, further comprising computer-usable program code to update the list to include newer more efficient copy algorithms.

12. The computer program product of claim 9, wherein the list includes hardware requirements for each copy algorithm.

13. The computer program product of claim 8, wherein determining whether a more efficient copy algorithm is available comprises determining whether the original copy algorithm is a best copy algorithm available based on a current hardware configuration.

14. The computer program product of claim 8, wherein intercepting an original request comprises intercepting an original request intended for a system data mover.

15. A system for increasing the efficiency of copying data, the system comprising:
   at least one processor;
   at least one memory device operably coupled to the at least one processor and storing instructions for execution on the at least one processor, the instructions causing the at least one processor to:
   intercept an original request to copy data from a first location to a second location;
   determine whether a parameter is set to use a more efficient copy algorithm available to execute the original request;
   in the event the parameter is set, determine whether a more efficient copy algorithm is available to copy the data;
   if a more efficient copy algorithm is not available, leave the original request unchanged; and
   if a more efficient copy algorithm is available, modify the original request by substituting the more efficient copy algorithm for the original copy algorithm.

16. The system of claim 15, wherein substituting the more efficient copy algorithm comprises looking in a prioritized list of copy algorithms, and selecting the more efficient copy algorithm from the list.

17. The system of claim 16, wherein selecting the more efficient copy algorithm comprises selecting a most efficient copy algorithm in the list.

18. The system of claim 16, wherein the list includes hardware requirements for each copy algorithm.

19. The system of claim 15, wherein determining whether a more efficient copy algorithm is available comprises determining whether the original copy algorithm is a best copy algorithm available based on a current hardware configuration.

20. The system of claim 15, wherein intercepting an original request comprises intercepting an original request intended for a system data mover.

* * * * *